(No Model.)
E. PENNEY.
COMPRESSOR PUMP.
No. 416,071. Patented Nov. 26, 1889.
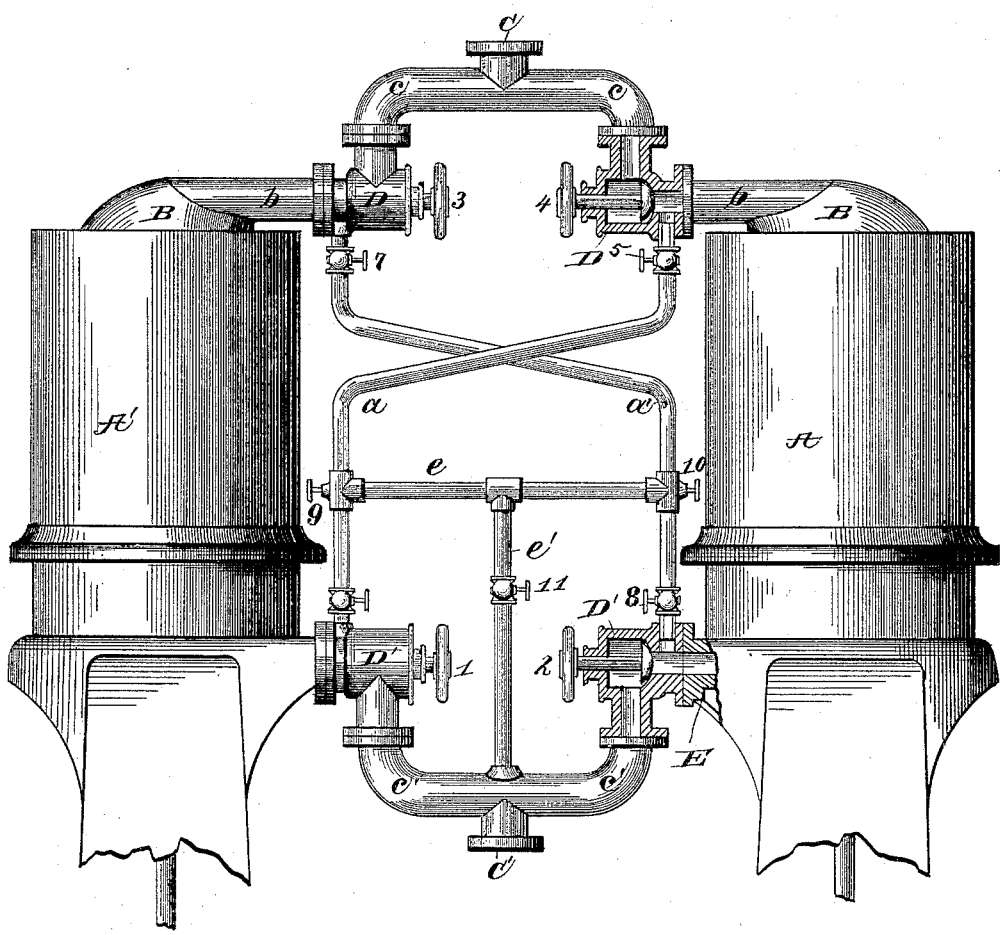
Witnesses
G. A. Tauberschmidt
L. B. Whitaker
Inventor
Edgar Penney
By his Attorneys
Whitaker & Prevost

UNITED STATES PATENT OFFICE.

EDGAR PENNEY, OF WAYNESBOROUGH, PENNSYLVANIA.

COMPRESSOR-PUMP.

SPECIFICATION forming part of Letters Patent No. 416,071, dated November 26, 1889.

Application filed July 9, 1887. Serial No. 243,837. (No model.)

*To all whom it may concern:*

Be it known that I, EDGAR PENNEY, a citizen of the United States, residing at Waynesborough, in the county of Franklin and State of Pennsylvania, have invented certain new and useful Improvements in Compressor-Pumps; and I do hereby declare the following to be a full, clear, and exact description of the invention, such as will enable others skilled in the art to which it appertains to make and use the same.

My invention relates to double compressor-pumps for refrigerating apparatus, and comprises improvements in the construction which is made the subject of my application for patent, Serial No. 224,790, filed January 19, 1887, and in other features of construction, more fully disclosed in the following specification and claims.

The drawing represents a view of a double compressor-pump with my invention applied thereto.

A A are the pump-cylinders, inclosed in the usual water-jackets.

B B are the domes or hoods, attached to the discharge ends of said cylinders and provided with discharge-pipes $b$ $b$.

C is the main outlet-pipe of the two pumps, which is connected to the pipes $b b$ by pipes $c c$ and valve-chambers D. Each cylinder is provided with an inlet E, and this is connected to the main supply-pipe C' by pipes $c'$ $c'$ and valve-chambers D'. In each of these valve-chambers is located a positively-operated cock or valve, by which the inlet-passages may be closed and regulated as desired. These valves or cocks are designated 1, 2, 3, and 4 in the drawing.

$a$ $a'$ are two pipes, each connecting at its upper end with a valve-chamber of one of the cylinder-outlets, and at its lower end with the valve-chamber in the inlet-pipe of the opposite cylinder, substantially as shown in my former application, hereinbefore referred to. The pipe $a$ has near its upper end a cock 5, and near its lower end a cock 6, and the pipe $a'$ has corresponding cocks 7 and 8. The two pipes $a$ $a'$ are, intermediate their ends, connected by a pipe $e$, and the pipe $e$ is connected to the main supply-pipe or its connections $c'$ $c'$ by a pipe $e'$.

The pipe $e'$ is provided with a cut-off cock 11, and the connection between pipes $a$ $a'$ and pipe $e$ is controlled by cocks 9 and 10.

The pipes $a a'$ communicate with the valve-chambers D D and D' D' between the valve-seats and the cylinders, as shown. While I prefer this construction, I do not wish to be limited thereto, as my connecting-pipes $a$ $a'$ may be employed with cylinders having differently-constructed inlets and outlets, it being only necessary that the inlet and outlet should be provided with some means of cutting off or closing the same, and that the connecting-pipes should be made to communicate with said passages between such cut-off devices and the cylinders. In some cases I may provide means for retaining the discharge-valve of the cylinder in its closed position and connect the upper ends of the pipes $a$ $a'$ with the cylinder below said valves.

When the cocks 9 and 10 are closed, the passage through pipes $a$ $a'$ is unobstructed, and these pipes will then perform the functions and effect the results of pipes $a$ $a'$, described in my former application—that is, either of the said cylinders, when desired, can be freed from the gas contained therein. In order to do this, the inlet and outlet pipes are closed, and the cocks in the pipe connecting the cylinder with the inlet of the other cylinder opened. In setting the pumps in motion the desired result will be accomplished.

The pipes $e$ and $e'$ enable the operation of a single pump to be reversed. Supposing the pump A' to be at rest, by closing cocks 2, 4, 6, and 10, and opening cocks 3, 5, 7, 8, 9, and 11, pipe $a$ will become the supply-pipe for pump A, and the pipes $a$, $e$, and $e'$ its outlet or discharge passage. The gas will therefore be drawn from pipe C and its connections and discharged into pipe C' and that portion of the apparatus connected therewith.

I do not limit myself to two pump-cylinders, as any number may be connected together in a similar manner.

What I claim, and desire to secure by Letters Patent, is—

1. The combination, with a series of single-acting compressor-pumps, said series consisting of two or more of such pumps, each pump-cylinder being provided with an inlet and outlet having positive controlling-valves, of a passage connecting the outlet-pipe of one cylinder with the inlet of another cylinder, the connection with each cylinder being between the controlling-valve and the cylinder, and a direct connection between said passage and the main supply-pipe, substantially as described.

2. The combination, with a series of single-acting compressor-pumps, said series consisting of two or more of said pumps, each pump-cylinder being provided with an inlet and outlet having positive controlling-valves, of passages connecting the discharge end of each cylinder with the inlet of another cylinder, as described, and pipes connecting said passages directly with the supply-pipe, substantially as and for the purposes set forth.

3. The combination, with a series of single-acting compressor-pumps consisting of two or more of such pumps having positive controlling-valves in the inlets and outlets of the cylinders of said pumps, of the pipes $a\ a'$, connecting the inlets and outlets, as described, and pipes $e\ e'$, connecting the pipes $a\ a'$ directly with the supply-pipe, and positive controlling-cocks in said pipes, as and for the purposes set forth.

In testimony whereof I affix my signature in the presence of two witnesses.

EDGAR PENNEY.

Witnesses:
D. M. GOOD, Jr.,
W. A. HARBAUGH.